(12) United States Patent
Ellenbeck et al.

(10) Patent No.: US 11,917,517 B2
(45) Date of Patent: Feb. 27, 2024

(54) POWER-EFFICIENT SYNCHRONIZATION FOR LONG-RANGE DEVICE-TO-DEVICE COMMUNICATIONS

(71) Applicant: Apple Inc., Cupertino, CA (US)

(72) Inventors: Jan Ellenbeck, Gruenwald (DE); Biljana Badic, Munich (DE); Christian Drewes, Germering (DE)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 17/379,458

(22) Filed: Jul. 19, 2021

(65) Prior Publication Data

US 2023/0013335 A1   Jan. 19, 2023

(51) Int. Cl.
| | | |
|---|---|---|
| H04W 4/90 | (2018.01) | |
| H04B 1/00 | (2006.01) | |
| H04W 40/22 | (2009.01) | |
| H04W 76/14 | (2018.01) | |
| H04W 76/28 | (2018.01) | |
| H04W 92/18 | (2009.01) | |

(52) U.S. Cl.
CPC .............. *H04W 4/90* (2018.02); *H04B 1/005* (2013.01); *H04W 40/22* (2013.01); *H04W 76/14* (2018.02); *H04W 76/28* (2018.02); *H04W 92/18* (2013.01)

(58) Field of Classification Search
CPC ....... H04W 4/90; H04W 76/28; H04W 76/14; H04W 40/22; H04W 92/18; H04B 1/005
USPC ...................................................... 455/404.1
See application file for complete search history.

(56) References Cited

U.S. PATENT DOCUMENTS

| | | | |
|---|---|---|---|
| 10,080,246 B2 | 9/2018 | Kim et al. | |
| 11,671,988 B2* | 6/2023 | Jeon ................... | H04W 72/0453 370/329 |
| 2006/0025136 A1* | 2/2006 | Fujita ................ | H04W 74/0816 455/436 |
| 2006/0221910 A1* | 10/2006 | Narasimha ............ | H04W 68/02 370/347 |
| 2007/0261076 A1* | 11/2007 | Puputti ............... | H04N 21/4623 348/E7.056 |
| 2010/0061284 A1* | 3/2010 | Chen ................... | H04W 52/146 370/311 |
| 2010/0248732 A1* | 9/2010 | Baldemair ............ | H04W 72/23 455/450 |
| 2012/0314739 A1* | 12/2012 | Bhadra ............... | H04W 40/246 375/219 |

(Continued)

*Primary Examiner* — Mark G. Pannell
(74) *Attorney, Agent, or Firm* — Treyz Law Group, P.C.; Michael H. Lyons

(57) ABSTRACT

A communications network may include user equipment (UE) devices. When a first UE device becomes off-grid and has an emergency message, the first UE device may transmit device-to-device signals for receipt by a second UE device. The signals may include one or more preambles that precede the emergency message and that are used by the second UE device to perform synchronization with the first UE device. The second UE device may periodically activate a receiver during a series of windows to listen for the signals, may receive a preamble sequence during one of the windows, and may synchronize its timing to the first UE device for receipt of the emergency message based on the preamble sequence. This may allow the UE devices to be synchronized for transfer of the emergency message over long distances while consuming a minimal amount of power on the second UE device.

20 Claims, 9 Drawing Sheets

(56) References Cited

U.S. PATENT DOCUMENTS

| | | | |
|---|---|---|---|
| 2013/0028165 A1* | 1/2013 | Kim | H04W 72/30 |
| | | | 370/312 |
| 2015/0334044 A1* | 11/2015 | Auerbach | H04L 67/01 |
| | | | 709/203 |
| 2016/0381711 A1 | 12/2016 | Kim et al. | |
| 2017/0245245 A1* | 8/2017 | Kim | H04W 72/21 |
| 2017/0264406 A1* | 9/2017 | Lei | H04J 11/0069 |
| 2018/0270801 A1 | 9/2018 | Novlan et al. | |
| 2018/0376408 A1* | 12/2018 | Ra | H04W 48/10 |
| 2019/0090293 A1 | 3/2019 | Su | |
| 2019/0253867 A1 | 8/2019 | Abedini et al. | |
| 2019/0372653 A1 | 12/2019 | Chae et al. | |
| 2020/0037361 A1* | 1/2020 | Chakraborty | H04W 74/0833 |
| 2020/0413239 A1 | 12/2020 | Pu et al. | |
| 2023/0164845 A1* | 5/2023 | Li | H04W 74/0833 |
| | | | 370/329 |

\* cited by examiner

POWER-EFFICIENT SYNCHRONIZATION FOR LONG-RANGE DEVICE-TO-DEVICE COMMUNICATIONS

FIELD

This disclosure relates generally to wireless communications, including wireless communications performed by user equipment devices.

BACKGROUND

Communications systems often include user equipment and wireless base stations. The wireless base stations have corresponding coverage areas. When the user equipment is located within a coverage area, radio-frequency signals are exchanged between the user equipment and a wireless base station to convey wireless data.

In practice, there arise situations where the user equipment is no longer within the coverage areas of the wireless base stations. In these situations, the user equipment is unable to convey wireless data with the wireless base stations. However, scenarios may still arise where the user equipment needs to send wireless data to a recipient while the user equipment is located outside of the coverage areas of the wireless base stations.

SUMMARY

A communications network may include user equipment (UE) devices and external communications equipment such as wireless base stations or access points. A first UE device may wirelessly communicate with the rest of the network via the external communications equipment while on-grid. When the first UE device becomes off-grid, the first UE device may still occasionally need to send messages such as emergency messages to a second UE device. However, going off-grid may cause timing on the first UE device to drift with respect to timing on the second UE device.

When the first UE device is off-grid and has an emergency message or other data to transmit, the first UE device may transmit device-to-device (D2D) signals for receipt by the second UE device. The D2D signals may include one or more preambles that precede the emergency message and that are used by the second UE device to perform time and frequency synchronization with the first UE device. The second UE device may periodically activate a receiver during a series of receiver (RX) windows to listen for the D2D signals. The second UE device may deactivate the receiver between the RX windows to conserve power. The second UE device may receive a preamble sequence during one of the RX windows. The second UE device may synchronize its timing to the timing of the first UE device for subsequent receipt of the emergency message based on the preamble sequence received during the RX window.

The one or more preambles may, for example, include a series of N preambles. Each preamble in the series of N preambles may identify a respective time offset between that preamble and the subsequent transmission of the emergency message. If desired, the series of N preambles may be divided into a first set of odd-numbered preambles and a second set of even-numbered preambles that precede respective transmissions of the emergency message. In other examples, the one or more preambles may include an extended preamble. The second HE device may receive a portion of the extended preamble during the RX window. The second UE device may keep its receiver active after the RX window and until an end of the extended preamble is received. The second UE device may then re-activate the receiver after a predetermined time offset has elapsed since the end of the extended preamble for receiving the emergency message. If desired, the extended preamble may be provided with a binary cover code that varies across a length of the extended preamble. In these examples, the second UE device may identify the time offset based on the binary cover code and may deactivate the receiver after the RX window to conserve power. These techniques may allow the first and second UE devices to be synchronized for transfer of the emergency message over long distances while one or both of the UE devices is off-grid, all while consuming a minimal amount of power on the second UE device.

An aspect of the disclosure provides a user equipment device. The user equipment device may include one or more antennas. The user equipment device may include a transmitter configured to transmit device-to-device (D2D) signals to an additional user equipment device using the one or more antennas. The user equipment device may include one or more processors. The one or more processors may be configured to transmit a message in the D2D signals. The one or more processors may be configured to transmit a preamble in the D2D signals prior to the message that identifies, for the additional user equipment device, a time offset between the preamble and the message.

An aspect of the disclosure provides a user equipment device. The user equipment device may include one or more antennas. The user equipment device may include a receiver configured to receive device-to-device (D2D) signals from an additional user device using the one or more antennas. The user equipment device may include one or more processors. The one or more processors may be configured to periodically activate the receiver during a series of receiver (RX) windows. The one or more processors may be configured to receive a preamble sequence in the D2D signals during an RX window of the series of RX windows. The one or more processors may be configured to deactivate the receiver after the RX window. The one or more processors may be configured to identify a time offset based the preamble sequence received during the RX window. The one or more processors may be configured to re-activate the receiver during a message listening window that begins once the identified time offset has elapsed since an end of the preamble sequence. The one or more processors may be configured to receive a message in the D2D signals during the message listening window.

An aspect of the disclosure provides a method of operating a first user equipment device to receive, from a second user equipment device, device-to-device (D2D) signals that include an emergency message preamble and an emergency message following the emergency message preamble. The method can include periodically activating a receiver on the first user equipment device during a series of receiver (RX) windows. The method can include receiving a portion of the emergency message preamble in the D2D signals during an RX window of the series of RX windows. The method can include keeping the receiver active until an end of the emergency message preamble has been received and then deactivating the receiver. The method can include re-activating the receiver during an emergency message listening window that begins after a predetermined time offset has elapsed since the end of the emergency message preamble. The method can include receiving the emergency message in the D2D signals during the emergency message listening window.

DETAILED DESCRIPTION

Figure 1:
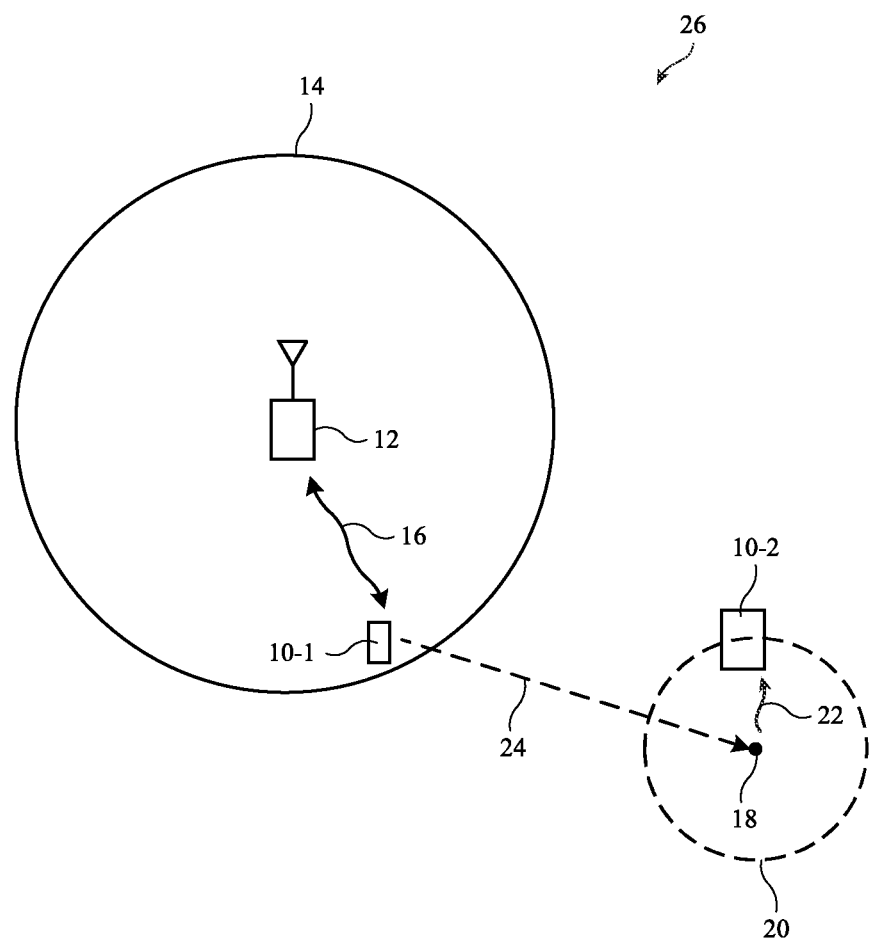
FIG. 1 is a diagram of an illustrative communications network having user equipment devices and external communications equipment such as a wireless base station or access point in accordance with some embodiments.

FIG. 1 is a schematic diagram of an illustrative communications system 26 (sometimes referred to herein as communications network 26) for conveying wireless data between communications terminals. Communications system 26 may include network nodes (e.g., communications terminals). The network nodes may include user equipment (UE) such as one or more UE devices 10. The network nodes may also include external communications equipment (e.g., communications equipment other than UE devices 10) such as external communications equipment 12. External communications equipment 12 may include a wireless base station or a wireless access point, for example. UE devices 10 and external communications equipment 12 may communicate with each other using wireless communications links. If desired, UE devices 10 may wirelessly communicate with external communications equipment 12 without passing communications through any other intervening network nodes in communications system 26 (e.g., UE devices 10 may communicate directly with external communications equipment 12 over-the-air).

Communications system 26 may form a part of a larger communications network that includes network nodes coupled to external communications equipment 12 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in the larger communications network via external communications equipment 12 (e.g., external communications equipment 12 may serve as an interface between user equipment devices 10 and the rest of the larger communications network). Some or all of the communications network may, if desired, be operated by a corresponding network operator or service provider.

External communications equipment 12 may include one or more antennas that provides wireless coverage for UE devices 10 located within a corresponding geographic area or region such as cell 14. The size of cell 14 may correspond to the maximum transmit power level of external communications equipment 12 and the over-the-air attenuation characteristics for radio-frequency signals conveyed by external communications equipment 12, for example. When a UE device 10 is located within cell 14, the UE device may communicate with external communications equipment 12 over a wireless link. To support the wireless link, external communications equipment 12 may transmit radio-frequency signals in a downlink (DL) direction from external communications equipment 12 to the UE device and/or the UE device may transmit radio-frequency signals in an uplink (UL) direction from the UE device to external communications equipment 12. In the example of FIG. 1, a first UE device 10 such as UE device 10-1 may be located within cell 14. UE device 10-1 may therefore communicate with external communications equipment 12 over a corresponding wireless link. Radio-frequency signals 16 may be conveyed between UE device 10-1 and external communications equipment 12 to support the wireless link.

In practice, situations may arise where UE device 10-1 is outside of the coverage area of external communications equipment 12 and the coverage area for any other wireless access points or base stations in communications system 26. For example, UE device 10-1 may move to a location 18, as shown by arrow 24. Location 18 is outside of cell 14 and outside of the coverage area of any other wireless access points or base stations in communications system 26. While at location 18, UE device 10-1 may sometimes be referred to as being "off-grid." UE device 10-1 may also be off-grid (e.g., outside of cell 14 and outside of the coverage area of any other wireless access points or base stations in communications system 26) when external communications equipment 12 is inactive, disabled, or otherwise unavailable to UE device 10-1 (e.g., due to a power outage or other disability at external communications equipment 12, due to a disaster or other emergency situation, due to network load balancing that excludes UE device 10-1, due to access to the rest of the communications network 26 being blocked or denied to UE device 10-1, due to intervening obstacles, terrain, or weather blocking UE device 10-1 from conveying radio-frequency signals with external communications equipment 12, etc.). Conversely, UE device 10-1 may sometimes be referred to as being "on-grid" when UE device 10-1 is within a coverage area such as coverage area 14 and is able to convey wireless data with the rest of the network (e.g., communications system 26) via external communications equipment 12.

When UE device 10-1 is located off-grid, UE device 10-1 may still need to provide wireless data such as message data, voice data, video data, or other data to a communications terminal in communications system 26 or to another UE device such as UE device 10-2. For example, the user of UE device 10-1 may encounter an emergency while off-grid and may need to use UE device 10-1 to send an emergency message to the authorities (e.g., emergency services) and/or another person to alert the authorities and/or another person to the user's situation and/or to call for help.

While off-grid, UE device 10-1 may still be able to convey radio-frequency signals with other UE devices such as UE device 10-2 (e.g., over a wireless device-to-device (D2D) link). UE device 10-1 may have its own coverage area 20 (e.g., extending around location 18 when UE device 10-1 is at location 18). The size of coverage area 20 is determined by the maximum transmit power level of UE device 10-1 and the over-the-air attenuation characteristics for radio-frequency signals transmitted by UE device 10-1. When the user needs to send an emergency message while off-grid, UE device 10-1 may transmit radio-frequency signals 22 that include an emergency message or other wireless data. When there is another UE device such as UE device 10-2 within coverage area 20, UE device 10-2 may receive radio-frequency signals 22 and thus the emergency message transmitted by UE device 10-1. UE device 10-2 may then alert emergency services and/or may provide assistance to the user of UE device 10-1. In situations where UE device 10-2 is located within cell 14 (e.g., whereas UE device 10-1 is located outside of cell 14), UE device 10-2 may additional or alternatively relay the emergency message transmitted by UE device 10-1 to other network nodes such as network nodes operated by emergency services (e.g., a "911" service in the United States) or to other users. Radio-frequency signals 22 are D2D signals and may therefore sometimes be referred to herein as D2D signals 22. D2D signals 22 may form a corresponding wireless D2D communications link between UE device 10-1 and UE device 10-2. Implementations in which D2D signals 22 include an emergency message transmitted by UE device 10-1 are merely illustrative and described herein as an example. In general, D2D signals 22 may include any desired data (e.g., message data, voice data, application data, video data, etc.) for transmission to UE device 10-2. UE device 10-2 may also transmit D2D signals to UE device 10-1 (e.g., the D2D link may be a bidirectional link).

Figure 2:
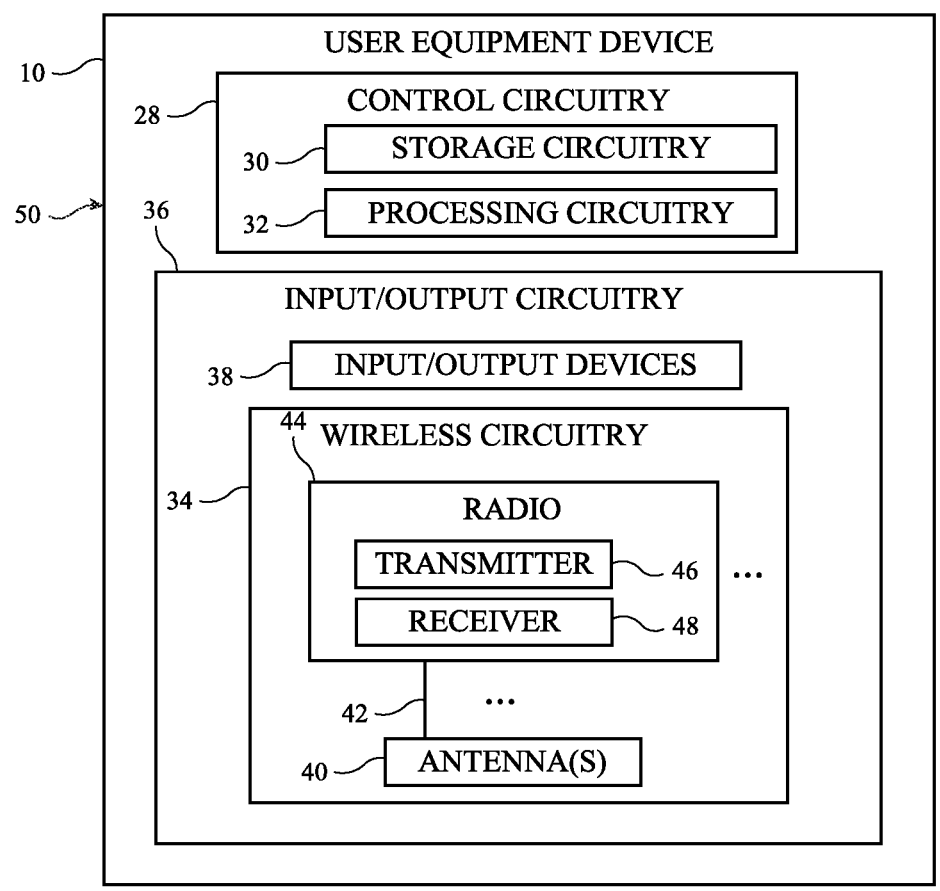
FIG. 2 is a block diagram of an illustrative user equipment device in accordance with some embodiments.

FIG. 2 is a block diagram of an illustrative user equipment device 10 (e.g., one or both of UE devices 10-1 and 10-2 of FIG. 1). UE device 10 is an electronic device and may therefore sometimes be referred to herein simply as device 10. UE device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in FIG. 2, UE device 10 may include components located on or within an electronic device housing such as housing 50. Housing 50, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 50 may be formed from dielectric or other low-conductivity material (e.g., glass, ceramic, plastic, sapphire, etc.). In other situations, housing 50 or at least some of the structures that make up housing 50 may be formed from metal elements.

UE device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 30 may include storage that is integrated within UE device 10 and/or removable storage media.

Control circuitry 28 may include processing circuitry such as processing circuitry 32. Processing circuitry 32 may be used to control the operation of UE device 10. Processing circuitry 32 may include on one or more processors, microprocessors, microcontrollers, digital signal processors, host processors, baseband processor integrated circuits, application specific integrated circuits, central processing units (CPUs), graphics processing units (GPUs), etc. Control circuitry 28 may be configured to perform operations in UE device 10 using hardware (e.g., dedicated hardware or circuitry), firmware, and/or software. Software code for performing operations in UE device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on UE device 10 such as satellite navigation applications, internet browsing applications, voice-over-internet-protocol (VOIP) telephone call applications, email applications, media playback applications, operating system functions, etc. To support interactions with external communications equipment, control circuitry 28 may be used in implementing communications protocols. Communications protocols that may be implemented using control circuitry 28 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols, or any other desired communications protocols. Each communications protocol may be associated with a corresponding radio access technology (RAT) that specifies the physical connection methodology used in implementing the protocol.

UE device 10 may include input-output circuitry 36. Input-output circuitry 36 may include input-output devices 38. Input-output devices 38 may be used to allow data to be supplied to UE device 10 and to allow data to be provided from UE device 10 to external devices. Input-output devices 38 may include user interface devices, data port devices, and other input-output components. For example, input-output devices 38 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 38 may be peripherals that are coupled to a main processing unit or other portion of UE device 10 via a wired or wireless link).

Input-output circuitry 36 may include wireless circuitry 34 to support wireless communications. Wireless circuitry 34 (sometimes referred to herein as wireless communications circuitry 34) may include one or more antennas 40. Wireless circuitry 34 may also include one or more radios 44. Radio 44 may include circuitry that operates on signals at baseband frequencies (e.g., baseband circuitry) and radio-frequency transceiver circuitry such as one or more radio-frequency transmitters 46 and one or more radio-frequency receivers 48. Transmitter 46 may include signal generator circuitry, modulation circuitry, mixer circuitry for upconverting signals from baseband frequencies to intermediate frequencies and/or radio frequencies, amplifier circuitry such as one or more power amplifiers, digital-to-analog converter (DAC) circuitry, control paths, power supply paths, switching circuitry, filter circuitry, and/or any other circuitry for transmitting radio-frequency signals using antenna(s) 40. Receiver 48 may include demodulation circuitry, mixer circuitry for downconverting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antenna(s) 40. The components of radio 44 may be mounted onto a single substrate or integrated into a single integrated circuit, chip, package, or system-on-chip (SOC) or may be distributed between multiple substrates, integrated circuits, chips, packages, or SOCs.

Antenna(s) 40 may be formed using any desired antenna structures for conveying radio-frequency signals. For example, antenna(s) 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 40 over time. If desired, two or more of antennas 40 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given pointing direction.

The term "convey radio-frequency signals" as used herein means the transmission and/or reception of the radio-frequency signals (e.g., for performing unidirectional and/or bidirectional wireless communications with external wireless communications equipment). Antenna(s) 40 may transmit the radio-frequency signals by radiating the radio-frequency signals into free space (or to free space through intervening device structures such as a dielectric cover layer). Antenna(s) 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Each radio 44 may be coupled to one or more antennas 40 over one or more radio-frequency transmission lines 42. Radio-frequency transmission lines 42 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 42 may be integrated into rigid and/or flexible printed circuit boards if desired. One or more radio-frequency lines 42 may be shared between multiple radios 44 if desired. Radio-frequency front end (RFFE) modules may be interposed on one or more radio-frequency transmission lines 42. The radio-frequency front end modules may include substrates, integrated circuits, chips, or packages that are separate from radios 44 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 42.

Radio 44 may transmit and/or receive radio-frequency signals within corresponding frequency bands at radio frequencies (sometimes referred to herein as communications bands or simply as "bands"). The frequency bands handled by radio 44 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

Transmitter 46 may transmit radio-frequency signals over antenna(s) 40 when transmitter 46 is active (e.g., enabled). Transmitter 46 does not transmit radio-frequency signals over antenna(s) 40 when transmitter 46 is inactive (e.g., disabled or not actively transmitting sign). Similarly, receiver 48 may receive radio-frequency signals over antenna(s) 40 when receiver 48 is active (e.g., enabled). Receiver 48 does not receive radio-frequency signals over antenna(s) 40 when receiver 48 is inactive (e.g., disabled). Control circuitry 28 may control transmitter 46 to be active or inactive at any given time. Control circuitry 28 may also control receiver 48 to be active or inactive at any given time. Control circuitry 28 may activate or deactivate transmitter 46 and/or receiver 48 at different times as dictated by a communications protocol governing radio 44 and/or based on instructions provided by a user and/or from other software running on control circuitry 28, for example. Control circuitry 28 may configure transmitter 46 to be inactive by powering off transmitter 46, by providing control signals to switching circuitry on power supply or enable lines for transmitter 46, by providing control signals to control circuitry on transmitter 46, and/or by providing control signals to switching circuitry within transmitter 46, for example. When transmitter 46 is inactive, some or all of transmitter 46 may be inactive (e.g., disabled or powered off) or transmitter 46 may remain powered on but without transmitting radio-frequency signals over antenna(s) 40. Similarly, control circuitry 28 may configure receiver 48 to be inactive by powering off receiver 48, by providing control signals to switching circuitry on power supply or enable lines for receiver 48, by providing control signals to control circuitry on receiver 48, and/or by providing control signals to switching circuitry within receiver 48, for example. When receiver 48 is inactive, some or all of receiver 48 may be disabled (e.g., powered off) or receiver 48 may remain powered on but without actively receiving radio-frequency signals incident upon antenna(s) 40. Transmitter 46 and receiver 48 may consume more power on UE device 10 when active than when inactive (e.g., a battery on UE device 10 may drain more rapidly while transmitter 46 and receiver 48 are active than while transmitter 46 or receiver 48 are inactive).

The example of FIG. 2 is merely illustrative. While control circuitry 28 is shown separately from wireless circuitry 34 in the example of FIG. 1 for the sake of clarity, wireless circuitry 34 may include processing circuitry (e.g., one or more processors) that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband circuitry (e.g., one or more baseband processors), digital control circuitry, analog control circuitry, and/or other control circuitry that forms part of radio 44. The baseband circuitry may, for example, access a communication protocol stack on control circuitry 28 (e.g., storage circuitry 30) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 34.

When UE device 10-1 of FIG. 1 is off-grid, UE device 10-1 should still be reachable in case the user of UE device 10-1 encounters an emergency or otherwise needs to transmit wireless data to another UE device such as UE device 10-2. To maximize the likelihood that another UE device such as UE device 10-2 will be able to receive D2D signals 22, UE device 10-1 should be able to transmit D2D signals 22 over a relatively long distance (e.g., it may be desirable for UE device 10-1 to have as large a coverage area 20 as possible). This distance (e.g., the radius of coverage area 20) may be as far as hundreds of meters, a few km, several km, or dozens of km, for example. UE device 10-1 may maximize the range of D2D signals 22 by transmitting at relatively high transmit power levels (e.g., a maximum transmit power level) and for a relatively long amount of time.

In general, UE device 10-1 may transmit D2D signals 22 at any desired frequencies (e.g., frequencies in an ISM band, an unlicensed band, a band reserved for emergency/public services, etc.). If desired, UE device 10-1 may transmit D2D signals 22 at relatively low frequencies such as frequencies in a frequency band below 1 GHz, below 2 GHz, below 3 GHz, below 950 MHz, etc. This may serve to minimize over-the-air signal attenuation for D2D signals 22, thereby maximizing the size of coverage area 20. The wireless circuitry 34 on UE device 10-1 may include a dedicated radio 44 for transmitting D2D signals 22 or the radio that transmits D2D signals 22 may also transmit other signals associated with other communications protocols or RATs (e.g., a single radio 44 on UE device 10-1 may convey both WLAN signals and D2D signals 22, a single radio 44 on UE device 10-1 may convey both cellular telephone signals and D2D signals 22, etc.).

At the same time, even when UE device 10-2 is located within coverage area 20, UE device 10-2 is only able to correctly recover wireless data (e.g., an emergency message) in D2D signals 22 (a) when the receiver 48 on UE device 10-2 is active and (b) when UE device 10-2 is time-synchronized with UE device 10-1. While UE device 10-2 can keep its receiver 48 active at all times to listen for any D2D signals 22 that happen to be transmitted, this would consume an excessive amount of power in UE device 10-2, causing UE device 10-2 to drain its battery relatively quickly. Keeping receiver 48 active at all times is particularly power-inefficient because off-grid UE devices such as UE device 10-1 only need to transmit emergency messages or other wireless data in D2D signals 22 on rare occasions. In addition, while UE devices can synchronize to each other using signals from external communications equipment 12 when located within cell 14 (e.g., the base station can configure sleeping patterns and paging cycles to allow the devices to sleep when able to save power), UE devices that are off-grid such as UE device 10-1 and UE device 10-2 are not previously synchronized to each other or to a time reference. Even if the UE devices are time-synchronized at one point in time (e.g., while both UE devices are on-grid), the timing for UE device 10-1 can drift with respect to the timing for UE device 10-2 once one or both of the UE devices go off-grid. As such, simple paging mechanisms may be insufficient to allow UE device 10-2 to correctly receive and recover wireless data in D2D signals 22. It would therefore be desirable to provide power efficient systems and methods for the time-synchronized transmission of D2D signals 22 by UE device 10-1 and reception of D2D signals 22 by UE device 10-2 while at least UE device 10-1 is off-grid.

Some communications protocols such as Wi-Fi incorporate time synchronization methods that are configured for much shorter ranges than those associated with coverage area 20. These short-range protocols are unsuitable for conveying D2D signals 22 because the protocols would consume an excessive amount of power on UE devices 10-1 and/or 10-2, thereby draining battery at an excessive rate. In addition, these short-range protocols also operate under control of external communications equipment such as a wireless access point (AP) and follow the timing of the AP, but there is no AP available when the UE devices are off-grid. Other protocols like Wi-Fi neighborhood aware network (NAN) protocols do not support the desired long ranges for D2D signals 22 and expend excessive energy on maintaining synchronization so as not to be suitable for rare communications events like emergency message transmission.

In order to allow UE device 10-2 to minimize power consumption while listening for potential D2D signals 22, UE device 10-2 may periodically activate its receiver 48 during receiver (RX) windows, during which the receiver is able to receive D2D signals 22 (e.g., where the receiver is inactive between the RX windows). When the duration of the RX windows is short, there is a high likelihood that any transmission of D2D signals 22 will arrive at UE device 10-2 while the receiver is inactive—thereby preventing proper recovery of the data in D2D signals 22 by UE device 10-2. When the duration of the RX windows is long, there is a greater likelihood that a transmission of D2D signals 22 will arrive at UE device 10-2. However, longer RX windows cause UE device 10-2 to consume an excessive amount of power, in effect "searching" for D2D signals 22 that are only rarely transmitted by another UE device. It would instead be more power efficient for UE device 10-1 to expend power searching for a potential receiver device such as UE device 10-2 than vice versa. UE device 10-1 may search for a potential receiver device by transmitting one or more preambles before transmitting the desired data (e.g., an emergency message) for reception at UE device 10-2.

Figure 3:
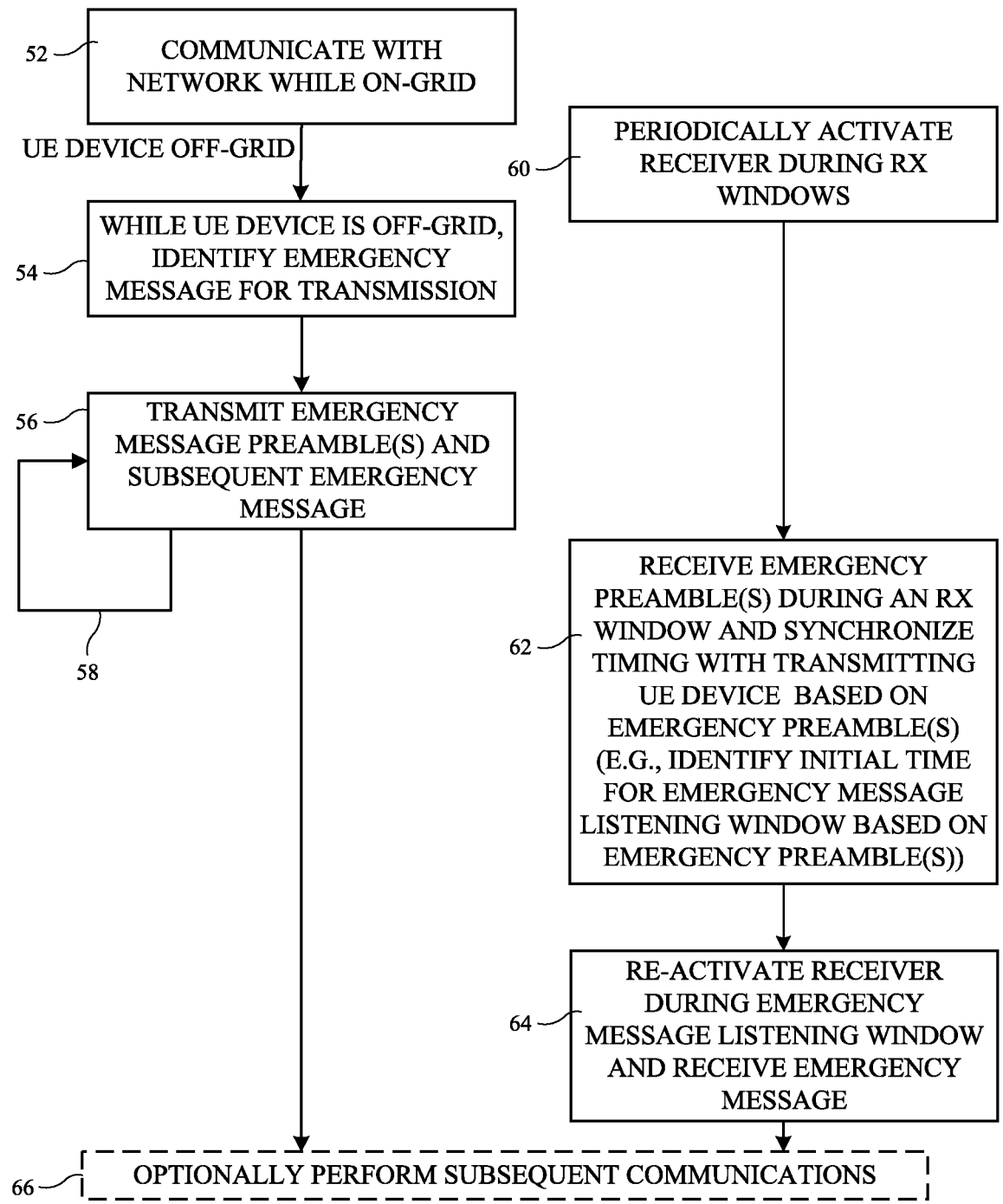
FIG. 3 is a flow chart of illustrative operations involved in using a first user equipment device to transmit device-to-device signals to a second user equipment device while minimizing power consumption at the second user equipment device in accordance with some embodiments.

FIG. 3 is a flow chart of illustrative operations involved in conveying D2D signals 22 between UE device 10-1 and UE device 10-2 in a time-synchronized and power efficient manner. Operations 52-56 and 66 of FIG. 3 may be performed by UE device 10-1. Operations 60-66 of FIG. 3 may be performed by UE device 10-2.

At operation 52, UE device 10-1 may communicate with the network (e.g., network nodes or terminals of communications system 26) via external communications equipment 12 while on-grid (e.g., while within cell 14 of FIG. 1). When UE device 10-1 becomes off-grid, processing may proceed to operation 54.

At operation 60, UE device 10-2 may periodically activate its receiver 48 during a series of RX windows. UE device 10-2 may listen for D2D signals 22 during the RX windows. The receiver 48 on UE device 10-2 may be inactive between the RX windows to conserve power.

At operation 54, while UE device 10-1 is off-grid, UE device 10-1 may identify wireless data for transmission to another UE device such as UE device 10-2 using D2D signals 22. UE device 10-1 may, for example, identify an emergency message to transmit in D2D signals 22. UE device 10-1 may generate the emergency message in response to a user input provided to a software application running on UE device 10-1 (e.g., in response to a user pressing an emergency call, emergency message, or "SOS" button displayed on a touch screen display, in response to a user activating an emergency response software application, etc.), in response to an application call by a software application running on UE device 10-1, in response to sensor data gathered by one or more sensors on UE device 10-1 (e.g., accelerometer data or other sensor data indicating that UE device 10-1 has been in an accident, fallen a great distance, been subject to a forceful impact, etc.), and/or in response to any other desired trigger condition. The emergency message may include information identifying the location of UE device 10-1 (e.g., based on GPS data or other location information gathered by UE device 10-1), user information, a message drafted by the user, and/or any other desired information to alert another person or emergency services of the user's situation or to call for help, as examples.

At operation 56, UE device 10-1 may activate its transmitter 46 and may transmit D2D signals 22 that include one or more preambles followed by the emergency message (e.g., D2D signals 22 may include the emergency message preceded by the one or more preambles). If desired, UE device 10-1 may periodically repeat this transmission, as shown by loopback path 58, to maximize the probability that another UE device such as UE device 10-2 will receive D2D signals 22. The emergency message may be separated from the end of the one or more preambles by a predetermined time period or offset time. This predetermined time period or offset time may be known to UE device 10-2 if desired (e.g., from software or other data on both UE device 10-1 and 10-2, from a communications protocol governing D2D signals 22, etc.).

At operation 62, UE device 10-2 may receive at least a portion of one or more of the preambles transmitted by UE device 10-1 in D2D signals 22 during one of the RX windows during which the receiver 48 on UE device 10-2 is active. The control circuitry 28 on UE device 10-2 may process the received preamble to synchronize timing with UE device 10-1. For example, UE device 10-2 may identify (e.g., determine, calculate, compute, generate, produce, etc.) timing for an emergency message listening window during which UE device 10-1 will transmit the emergency message (e.g., the emergency message listening window may begin at an initial time that is separated from the end of the one or more preambles by a predetermined time period or offset time). This may serve to time-synchronize UE device 10-2 to UE device 10-1 so UE device 10-2 will be able to correctly recover the emergency message transmitted by UE device 10-1. If desired, UE device 10-2 may deactivate receiver 48 after identifying this timing and/or after receipt of the one or more preambles to conserve power.

At operation 64, the control circuitry 28 on UE device 10-2 may re-activate its receiver 48 during the emergency message listening window (e.g., based on the timing identified at operation 62). The receiver 48 on UE device 10-2 may receive the emergency message transmitted during the emergency message listening window. UE device 10-2 may perform any desired subsequent processing based on the received emergency message. For example, UE device 10-2 may alert or inform a user of UE device 10-2 about the emergency message and/or its contents, may transmit UL signals to external communications equipment 12 informing the network of the emergency message (e.g., when UE device 10-2 is located within cell 14), may transmit additional D2D signals to another UE device to inform that UE device of the emergency message (e.g., UE device 10-2 may provide the emergency message to external communications equipment 12 or other portions of the network via a relay of one or more additional UE devices, the last of which is located within cell 14), etc.

If desired, processing may proceed from operations 56 and 64 to optional operation 66. At optional operation 66, UE device 10-1 and UE device 10-2 may continue to communicate unidirectionally or bidirectionally using D2D signals (e.g., where the communications are time-synchronized and frequency-synchronized based on the emergency preambles processed by UE device 10-2 at operation 62). The example of FIG. 3 is merely illustrative. One or more iterations of operation 56 may be performed by UE device 10-1 concurrently with the performance of operations 62 and/or 64 by UE device 10-2.

Figure 4:
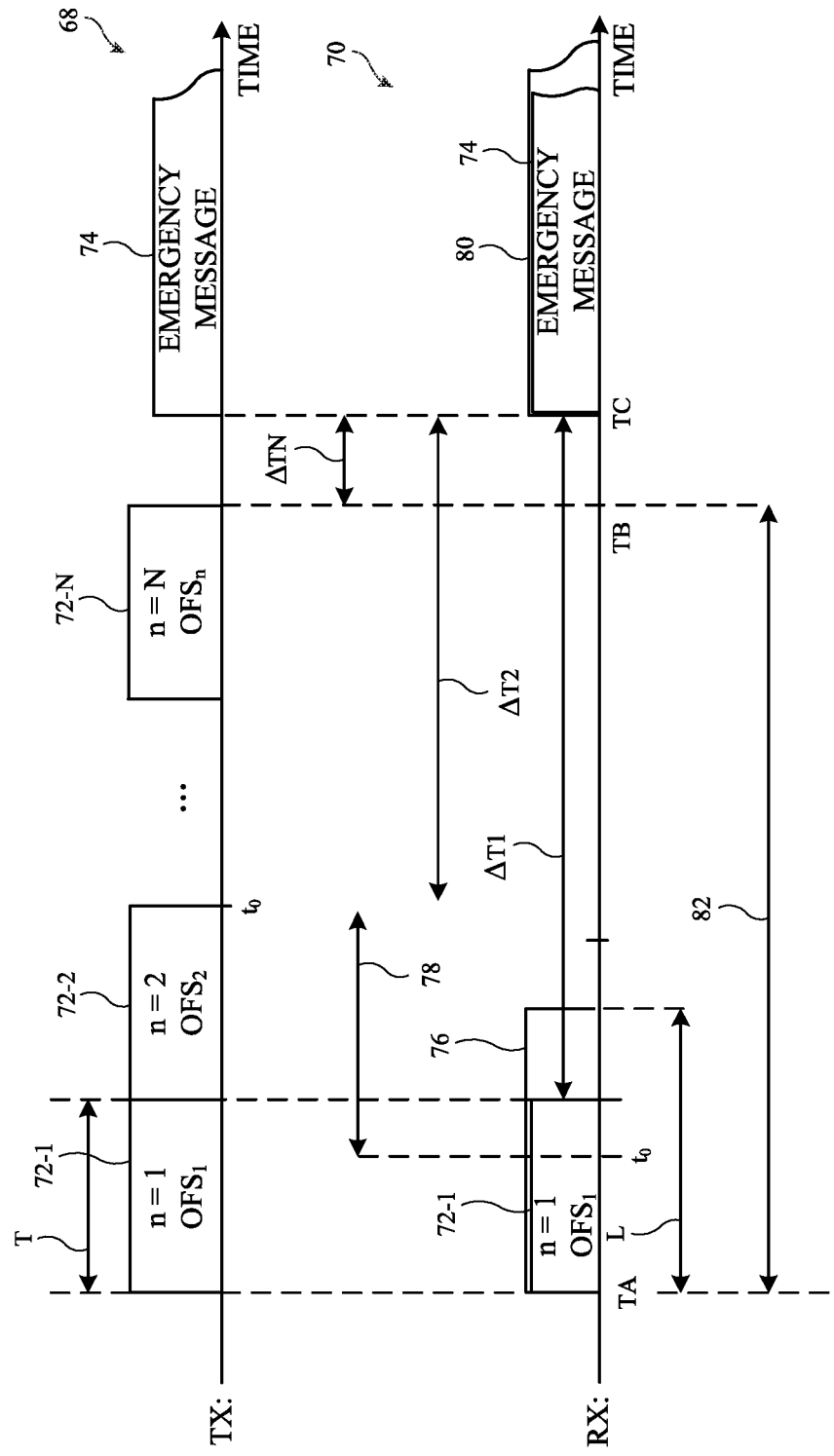
FIG. 4 includes timing diagrams showing how an illustrative first user equipment device may transmit device-to-device signals that include a series of preambles for time-synchronizing an illustrative second user equipment device to the first user equipment device in accordance with some embodiments.

FIG. 4 includes timing diagrams for one example in which the one or more preambles transmitted by UE device 10-1 (e.g., at operation 56 of FIG. 3) include a series of preambles that identify respective time offsets for synchronizing the timing of UE device 10-2 to the timing of UE device 10-1.

Timing diagram 68 of FIG. 4 plots transmit (TX) timing for UE device 10-1 in transmitting D2D signals 22. Timing diagram 70 of FIG. 4 plots receive (RX) timing for UE device 10-2 in receiving D2D signals 22. As shown by timing diagram 68, UE device 10-1 may begin to transmit a series of N preambles 72 at time TA, each of which is labeled by a corresponding index n from 1 to N (e.g., a first preamble 72-1, a second preamble 72-2 following preamble 72-1, an Nth preamble 72-N following an (N−1)th preamble, etc.). UE device 10-1 may then begin to transmit emergency message 74 after transmission of the series of N preambles 72 (e.g., after a predetermined offset time such as at time TC).

Each preamble 72 may be a sequence of bits having a predetermined (temporal) preamble length T that allows UE device 10-2 to detect the presence of a signal and to allow the receiver on UE device 10-2 to synchronize to the transmit timing for the transmitter in UE device 10-1. Preamble length T may be less than or equal to 1 ms, as an example. The duration of emergency message 74 is generally much longer than preamble length T. Preambles 72 may sometimes also be referred to herein as preamble sequences 72 or synchronization sequences 72. Each preamble 72 may be a known signal (e.g., of a format known to both UE device 10-1 and UE device 10-2) having relatively strong correlation properties to allow UE device 10-2 to easily detect and distinguish the preamble from background noise. Each preamble 72 may be a Zadoff Chu sequence or an M-sequence, as two examples.

Each preamble 72 in the series of N preambles may include or otherwise identify respective offset information $OFS_n$. Offset information $OFS_n$ may identify a time offset $\Delta Tn$ between the corresponding preamble and the time at which UE device 10-1 is going to begin transmitting emergency message 74 (time TC in the example of FIG. 4). For example, preamble 72-1 may include offset information $OFS_1$ that identifies a time offset $\Delta T1$ from the end of preamble 72-1 to the beginning of emergency message 74 (e.g., time offset $\Delta T1$ may be the time duration between time TA+T and time TC), preamble 72-2 may include offset information $OFS_2$ that identifies a time offset $\Delta T2$ from the end of preamble 72-2 to time TC, preamble 72-N may include offset information $OFS_N$ that identifies a time offset $\Delta TN$ from the end of preamble 72-N to time TC, etc. The series of N preambles 72 may be offset from emergency message 74 (in time) by offset time $\Delta TN$.

As shown by timing diagrams 68 and 70, UE device 10-1 may initially be out-of-sync with respect to UE device 10-2 by an a priori time offset 78. For example, a time $t_0$ as kept by UE device 10-2 may have drifted from the corresponding time $t_0$ as kept by UE device 10-1 by a priori time offset 78 since one or both of the UE devices went off-grid. UE devices 10-1 and 10-2 may retain coarse time synchronization via an internal/network standard/protocol (e.g., UTC) time (e.g., to within a maximum supported time uncertainty 82, which is equal to T*N). This internal standard time may be periodically adjusted/corrected whenever the UE device communicates with external communications equipment 12 or receives satellite navigation signals if desired (e.g., to synchronize time $t_0$ at each UE device to external communications equipment 12 and/or a satellite navigation system). Preambles 72 may allow UE device 10-2 to fine-tune its synchronization within maximum supported time uncertainty 82 to allow UE device 10-2 to correctly receive emergency message 74 while consuming a minimal amount of power.

When no time reference is available, a device will drift by D ppm so that at some later time, the relative offset between devices may prevent synchronization within maximum supported time uncertainty 82. As one possible countermeasure, UE device 10-1 may occasionally transmit a global clock beat preamble while off-grid that allows all nearby off-grid devices such as UE device 10-2 to adjust its time $t_0$ to match time $t_0$ on UE device 10-1 (e.g., so UE device 10-2 is coarsely synchronized to UE device 10-1 in case UE device 10-1 later needs to transmit an emergency message). Such a global clock beat preamble may be transmitted once an hour with some random offset, as one example.

UE device 10-2 may periodically activate its receiver 48 during RX windows 76, one of which is shown in FIG. 4. Each RX window 76 may be separated in time from the preceding and subsequent RX window by RX window periodicity P (not shown in FIG. 4 for the sake of clarity). RX window 76 may have (temporal) RX window length L. RX window length L may be greater than preamble length T to ensure that UE device 10-2 is able to fully receive at least one of the preambles 72 in the series of N preambles 72. RX window length L may, for example, be equal to 2*T, 1.5*T, 3*T, 4*T, more than 4*T, etc.

As shown by timing diagram 70, UE device 10-2 may receive preamble 72-1 during RX window 76. The control circuitry 28 on UE device 10-2 may process the received preamble 72-1 to identify time offset ΔT1 from the offset information $OFS_1$ of preamble 72-1 (e.g., while processing operation 62 of FIG. 3). UE device 10-2 may then have knowledge that it will receive emergency message 74 after time offset ΔT1 elapses after the end of preamble 72-1, thereby synchronizing the timing of UE device 10-2 to the timing of UE device 10-1. UE device 10-2 may deactivate its receiver 48 after RX time window 76 has ended to conserve power. UE device 10-2 may reactivate receiver 48 after time offset ΔT1 has elapsed since the end of preamble 72-1 (e.g., during an emergency message listening window 80 beginning at time TC). UE device 10-2 may then receive emergency message 74 during emergency message listening window 80. UE device 10-2 may correctly recover the emergency message 74 from D2D signals 22 because UE device 10-2 has been time-synchronized to UE device 10-1 using preambles 72. By transmitting a series of preambles 72, each of which identifies a respective time offset ΔTn, UE device 10-2 will be able to synchronize its timing to UE device 10-1 (e.g., for receipt of emergency message 74 at a common time TC now shared by both UE devices) regardless of where RX window 76 happens to land in the series of N preambles 72 transmitted by UE device 10-1. This may allow UE devices 10-1 and 10-2 to time-synchronize for receipt of a message in D2D signals 22 (e.g., emergency message 74) despite one or both devices being off-grid and therefore subject to potential clocking drift between the devices, while consuming a minimal amount of power on UE device 10-2.

Each preamble 72 may, for example, be the same type of sequence but having different variants for each index n (e.g., where UE device 10-2 identifies offset information $OFS_n$ and thus time offset ΔTn based on the particular variant of the sequence that is received during its RX window 76). Each variant may have strong autocorrelation properties with low cross-correlation between different variants (e.g., between variants or different preambles in the series of N preambles 72). Zadoff Chu sequences or M-sequences are two non-limiting examples of sequences that may fit these criteria. Depending on how many sequence variants are feasible (e.g., how large N can feasibly be), each variant may carry further information beyond time offset. For example, each variant may identify a frequency to use or a frequency hopping pattern indication to use for the subsequent receipt of emergency message 74. UE device 10-2 may process the preamble 72 received during its RX window 76 to identify the frequency or frequency hopping pattern indication to use for receiving emergency message 74. UE device 10-2 may then use that frequency or a frequency hopping pattern corresponding to the frequency hopping pattern indication when receiving emergency message 74 (e.g., within emergency message listening window 80). If desired, sequence variants may be used to convey further information besides beam hopping patterns. For example, sequence variants may be used to distinguish emergency from other paging types (e.g., where UE device 10-1 searches for another UE device 10-2 in their contact list to chat), limiting the number of potential responders to UE device 10-2 (e.g., by asking for devices that have internet connectivity), for dissemination of clock synchronization information, etc.

Detecting the particular variant of the preamble sequence received during RX window 76 (e.g., detecting the particular preamble 72 received during RX window 76) may carry the risk of a false positive detection. However, if the false positive rate is relatively low, only a small amount of energy will be consumed by UE device 10-2 in an unneeded emergency message reception attempt (e.g., activating the receiver on UE device 10-2 during emergency message listening window 80 does not excessively drain the battery on UE device 10-2). Preambles 72 may give UE device 10-2 an indication of the presence of an emergency message that is about to be transmitted while allowing for time and frequency synchronization between UE device 10-1 and 10-2. Emergency message 74 may include a cyclic redundancy check (CRC) or other measures that make it almost impossible for UE device 10-2 to decode a false positive emergency message. If desired, UE device 10-2 may leave its RX window open after receipt of a preamble 72 so UE device 10-2 receives all subsequent preambles 72. This may serve to further reduce the presence of false positives, for example.

Figure 5:
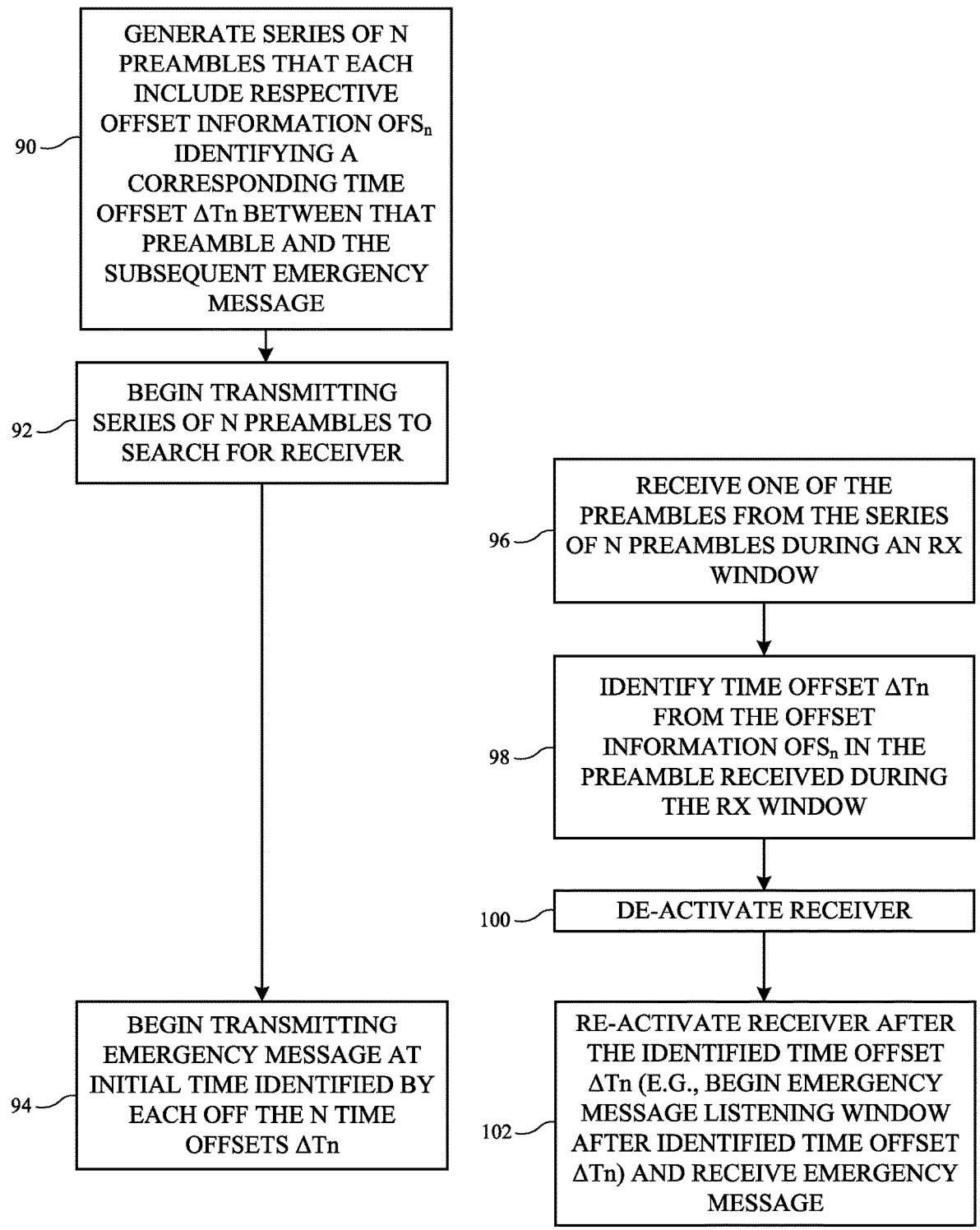
FIG. 5 is a flow chart of illustrative operations involved in using a first user equipment device to transmit device-to-device signals and in using a second user equipment device to synchronize receipt of a message transmitted by the first user equipment device based on a series of preambles in the device-to-device signals in accordance with some embodiments.

FIG. 5 is a flow chart showing how UE devices 10-1 and 10-2 may time-synchronize for the transfer of emergency message 74 based on the series of N preambles 72 shown in FIG. 4. Operations 90-94 of FIG. 5 may be performed by UE device 10-1 (e.g., while processing operation 56 of FIG. 3). Operations 96-102 of FIG. 5 may be performed by UE device 10-2 (e.g., while processing operations 62 and 64 of FIG. 3).

At operation 90 of FIG. 5, wireless circuitry 34 on UE device 10-1 may generate the series of N preambles 72 for transmission. Each preamble 72 may include respective offset information $OFS_n$, each of which identifies a corresponding time offset ΔTn from the end of that preamble until the transmission of emergency message 74 at time TC.

At operation 92, UE device 10-1 may begin transmitting the series of N preambles to search for a UE device within its coverage area 20 (FIG. 1).

At operation 96, the receiver 48 on UE device 10-2 (e.g., a UE device in coverage area 20) may receive one of the N preambles 72 transmitted by UE device 10-1 during one of its RX windows 76 when the receiver 48 on UE device 10-2 is active. For example, UE device 10-2 may receive preamble 72-1 during the RX window 76 shown in FIG. 4.

At operation 98, the control circuitry 28 on UE device 10-2 may identify (e.g., calculate, generate, determine, produce, compute, etc.) the time offset ΔTn associated with the received preamble 72 (e.g., control circuitry 28 may identify offset information $OFS_n$ and may identify time offset ΔTn based the identified offset information $OFS_n$). In the example of FIG. 4, UE device 10-2 may identify time offset ΔT1 based on the offset information $OFS_1$ in preamble 72-1. UE device 10-2 may identify the time offset according to the communications protocol governing D2D signals 22 or any other standard or scheme that is known to both UE devices 10-1 and 10-2 (e.g., as implemented using one or more software applications running on both UE devices 10-1 and 10-2).

At operation 100, UE device 10-2 may deactivate its receiver 48 (e.g., when the RX window has ended).

At operation 102, UE device 10-2 may reactivate its receiver 48 after the identified time offset ΔTn has elapsed since the end of the preamble received during RX window 76 (e.g., during emergency message listening window 80 beginning after ΔTn has elapsed since the end of the preamble). UE device 10-2 may then receive emergency message 74 during emergency message listening window 80

(sometimes referred to herein as emergency message listening period 80). In the example of FIG. 4, UE device 10-2 may reactivate its receiver 48 at time TC, which is separated in time from the end of preamble 72-1 by time offset ΔT1. UE device 10-2 may perform any desired subsequent processing based on the received emergency message 74.

As an example, preamble length T may be 25 ms. A relatively long preamble length such as 25 ms may allow for reliable detection of the preambles at a maximum distance. If RX window length L is 2*T and the preambles are consecutive, the duration of at least one full preamble length T will fit inside RX window 76. With a RX window periodicity P=5 seconds and an active duty cycle of 1%, for example, RX window length L will be 50 ms. With no preamble repetitions (i.e., with N=1), the maximum time offset would need to be +/−12.5 ms to still have one full preamble in the RX window. With a relative time drift of +/−10 ppm between UE device 10-1 and UE device 10-2, the UE devices would have drifted too far to time-synchronize after only about 20 minutes. Longer drift times between UE device 10-1 and UE device 10-2 are supported by using UE device 10-1 to perform transmitter-side searching for a receiver rather than using the receiver to search for a transmitter (e.g., by using UE device 10-1 to transmit a series of N preambles 72 where N is greater than one). For example, if N=4, the maximum time offset would need to be +/−(N/2)*L. When RX window length L is 50 ms and the drift is +/−10 ppm, the UE devices may still be time-synchronized using the transmitted preambles as long as 1.4 hours after going off-grid. Increasing N can further increase this time. In-device coexistence time alignment needs may be another motivation for the receiver other than clock drift, if desired. For example, time gaps of varying lengths may be associated with in-device coexistence schemes where the transmitter needs to protect other ongoing TX/RX operations (having arbitrary durations or transmit patterns) from the preamble transmission.

Because UE device 10-1 might be located relatively far from UE device 10-2, the transmitter 46 on UE device 10-1 may transmit for relatively long time periods and with relatively high transmit power levels. In some scenarios, these high transmit power levels may prevent the transmitter from continuously transmitting multiple sequential preambles 72 (e.g., because the power amplifier(s) in the transmitter may need time to cool off between transmissions). To mitigate these issues, UE device 10-1 may transmit a first subset of the series of N preambles 72 prior to a first transmission of emergency message 74 and then may transmit a second subset of the series of N preambles 72 prior to a subsequent second transmission of emergency message 74.

Figure 6:
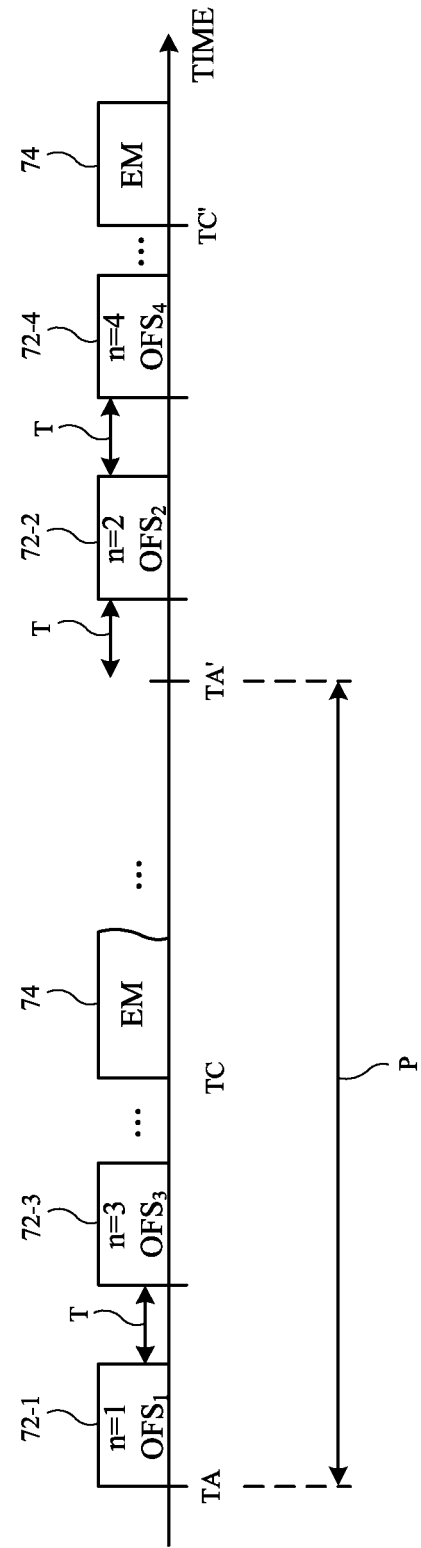
FIG. 6 is a timing diagram showing how an illustrative first user equipment device may divide a series of preambles between multiple transmissions of a message in device-to-device signals in accordance with some embodiments.

FIG. 6 is a timing diagram showing one example of how UE device 10-1 may transmit different subsets of the series of N preambles 72 prior to different transmissions of emergency message 74 (e.g., to allow cool-off time for the power amplifier(s) in transmitter 46). As shown in FIG. 6, UE device 10-1 may transmit a first set of the N preambles 72 such as the odd-numbered preambles in the series of preambles. For example, UE device 10-1 may transmit the first preamble 72-1 from the series of N preambles 72 at time TA. UE device 10-1 may then forego transmission of the second preamble from the series of N preambles 72 (e.g., for preamble length T) after transmission of the first preamble 72-1. UE device 10-1 may then transmit the third preamble 72-3 from the series of N preambles 72, may forego transmission of the fourth preamble, etc. At time TC, UE device 10-1 may transmit emergency message 74. Foregoing transmission of the even-numbered preambles may allow the power amplifier(s) in UE device 10-1 to cool off between transmission of the odd-numbered preambles.

After the transmission of emergency message 74 (e.g., after RX window periodicity P has elapsed since time TA), UE device 10-1 may then transmit the even-numbered preambles from the series of N preambles 72 prior to re-transmitting emergency message 74. For example, at time TA', UE device 10-1 may forego transmission of the first preamble from the series of N preambles 72 (e.g., for preamble length T). After preamble length T has passed (e.g., at time TA'+T), UE device 10-1 may transmit the second preamble 72-2 from the series of N preambles 72. UE device 10-2 may then forego transmission of the third preamble from the series of N preambles 72 (e.g., for preamble length T) after transmission of the second preamble 72-2. UE device 10-1 may then transmit the fourth preamble 72-4 from the series of N preambles 72, may forego transmission of the fifth preamble, etc. At time TC', UE device 10-1 may then re-transmit emergency message 74. This may allow UE device 10-2 to receive one of the preambles 72 prior to a transmission of emergency message 74 that is offset from the received preamble 72 by the time offset identified by that preamble 72, while allowing the power amplifier(s) on UE device 10-1 to cool off between transmissions at relatively high transmit power levels.

The example of FIG. 6 is merely illustrative and, in general, the first set and second sets of preambles may include any desired preambles from the series of N preambles 72 (e.g., the first set of preambles may include every other pair of sequential preambles 72, every other trio of sequential preambles 72, etc.). UE device 10-1 may divide the series of N preambles 72 into any desired number of sets (e.g., more than two sets) for transmission prior to any desired number of re-transmissions of emergency message 74. The example of FIGS. 4-6 in which UE device 10-1 transmits a series of multiple preambles 72 is merely illustrative. If desired, UE device 10-1 may instead transmit a single long (extended) preamble prior to transmitting emergency message 74.

Figure 7:
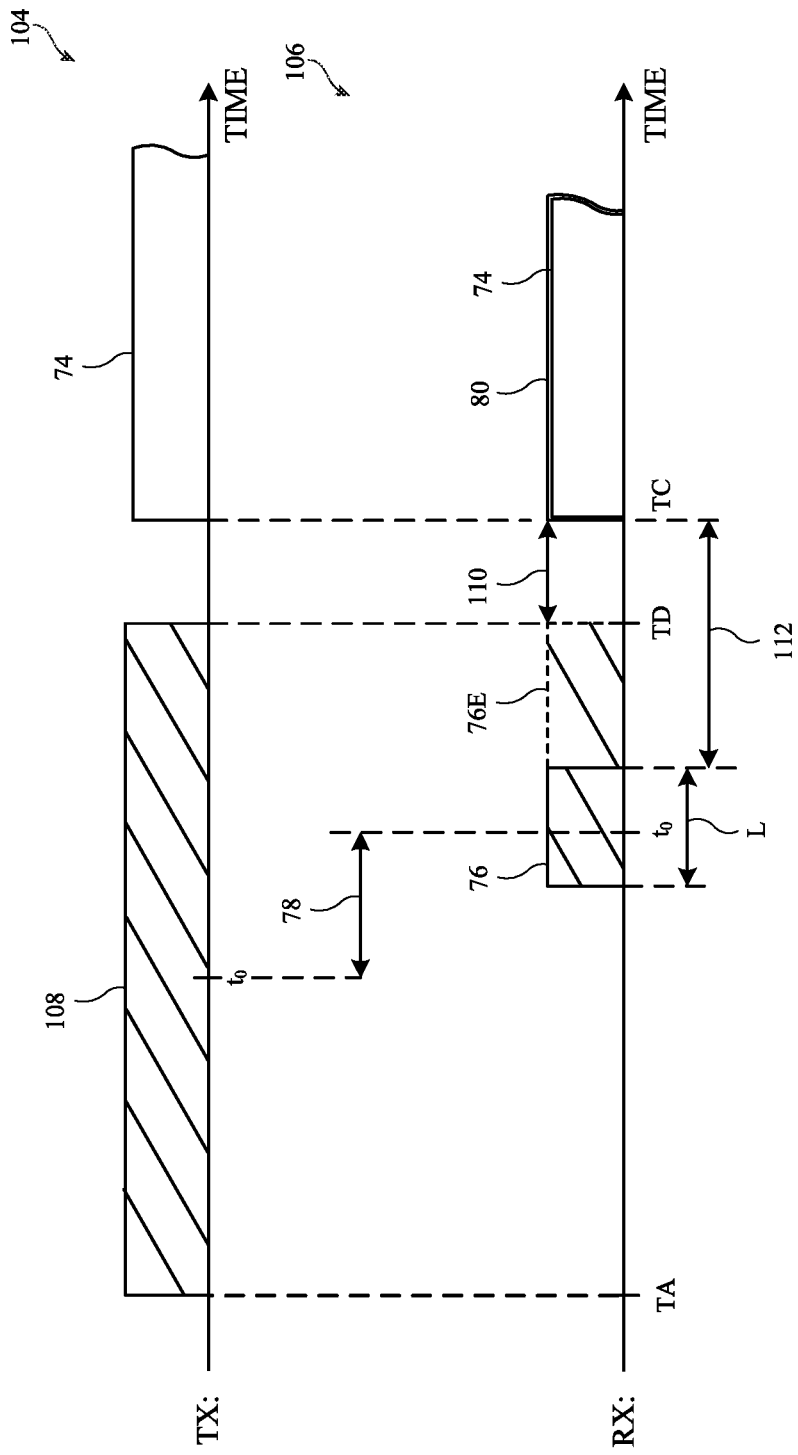
FIG. 7 includes timing diagrams showing how an illustrative first user equipment device may transmit device-to-device signals that include an extended preamble for time-synchronizing an illustrative second user equipment device to the first user equipment device in accordance with some embodiments.

FIG. 7 includes timing diagrams for one example in which UE device 10-1 transmits a single extended preamble prior to transmitting emergency message 74. Timing diagram 104 of FIG. 7 plots TX timing for UE device 10-1 in transmitting D2D signals 22. Timing diagram 106 of FIG. 7 plots RX timing for UE device 10-2 in receiving D2D signals 22.

As shown by timing diagram 104, UE device 10-1 may begin to transmit a single extended preamble 108 at time TA. Extended preamble 108 may sometimes also be referred to herein as extended preamble sequence 108 or extended synchronization sequence 108. Extended preamble 108 may have a duration extending from time TA until time TD. Extended preamble 108 may be a continuous preamble sequence (e.g., having a continuous series of bits). As an example, the sequence may be a repetition of the same sub-sequence, such as a repetition of a Zadoff Chu sequence (e.g., where each symbol lasts 1/14 ms) for hundreds of ms (e.g., extended preamble 108 may be hundreds of ms long).

As shown by timing diagram 106, the receiver on UE device 10-2 may be active during an RX window 76 that falls between times TA and TD. UE device 10-2 may therefore receive the portion (subset or subsequence) of extended preamble 108 falling within RX window 76. If desired, once UE device 10-2 has received a portion of extended preamble 108 within RX window 76, UE device 10-2 may keep its receiver 48 active after the end of RX window 76 until UE device 10-2 has received the end of extended preamble 108 (e.g., during an extended RX window 76E that extends the active time of the receiver from RX window length L until time TD). Once UE device 10-2 has received the end of extended preamble 108, UE device 10-2 may deactivate its receiver for predetermined time offset 110 (e.g., UE device 10-2 may deactivate receiver 48 in response to receiving the end of extended preamble 108).

After predetermined time offset 110 (e.g., at time TC), UE device 10-1 may transmit emergency message 74 and UE device 10-2 may re-activate its receiver (e.g., during receiver listening window 80) for receiving emergency message 74. Predetermined time offset 110 may be known to both UE device 10-1 and UE device 10-2 according to the communications protocol governing D2D signals 22, any other standard or scheme that is known to both UE devices 10-1 and 10-2 (e.g., as implemented using one or more software applications running on both UE devices 10-1 and 10-2), identified by information conveyed in extended preamble 108 itself, etc. In this way, the end of extended preamble 108 may serve as the time-synchronization trigger to synchronize the timing of UE device 10-2 with the timing of UE device 10-1 for receipt of emergency message 74, even if the UE devices had previous drifted apart by a priori time offset 78. Keeping the receiver on UE device 10-2 active during extended RX window 76E may allow UE device 10-2 to re-confirm the initial detection of extended preamble 108 during RX window 76, for example.

Figure 8:
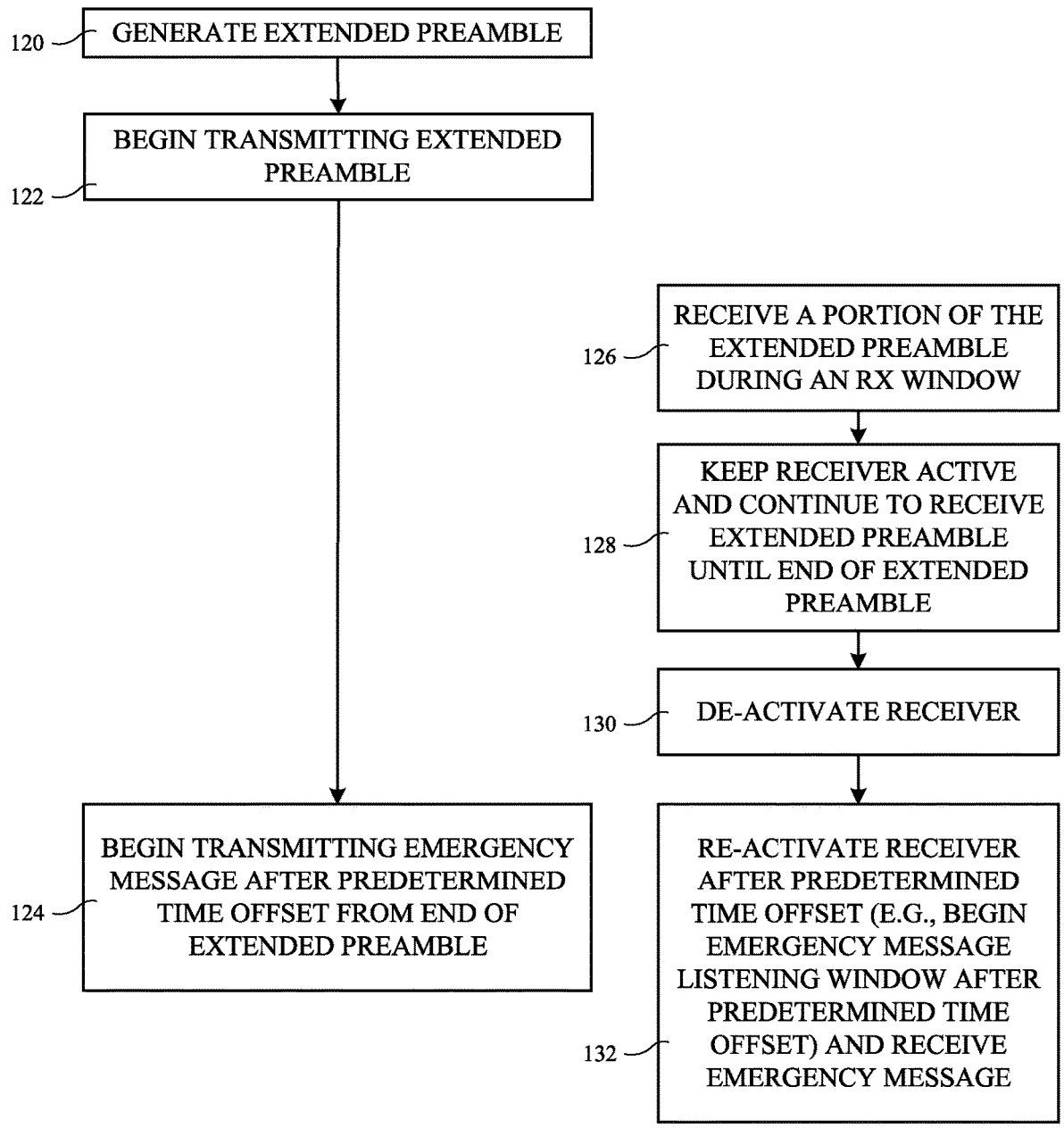
FIG. 8 is a flow chart of illustrative operations involved in using a first user equipment device to transmit device-to-device signals and in using a second user equipment device to synchronize receipt of a message transmitted by the first user equipment device based on an extended preamble in the device-to-device signals in accordance with some embodiments.

FIG. 8 is a flow chart of illustrative operations involved in transmitting and receiving an emergency message 74 that is time-synchronized based on extended preamble 108 of FIG. 7. Operations 120-124 of FIG. 8 may be performed by UE device 10-1 (e.g., while processing operation 56 of FIG. 3). Operations 126-132 of FIG. 8 may be performed by UE device 10-2 (e.g., while processing operations 62 and 64 of FIG. 3).

At operation 120 of FIG. 8, UE device 10-1 may generate extended preamble 108 for transmission.

At operation 122, UE device 10-1 may begin transmitting extended preamble 108 to search for a UE device within its coverage area 20 (FIG. 1).

At operation 126, the receiver 48 on UE device 10-2 (e.g., a UE device in coverage area 20) may receive a portion (subset or subsequence) of the extended preamble 108 transmitted by UE device 10-1 during one of its RX windows 76 when the receiver on UE device 10-2 is active.

At operation 128, UE device 10-2 may keep its receiver 48 active after RX window 76 has elapsed (e.g., during extended RX window 76E of FIG. 7). UE device 10-2 may continue to receive extended preamble 108 (during extended RX window 76E) until UE device 10-2 receives the end of extended preamble 108.

At operation 130, once UE device 10-2 has received the end of extended preamble 108, UE device 10-2 may disable its receiver 48 to conserve power.

At operation 124, after predetermined time offset 110 has elapsed since the end of extended preamble 108 was transmitted, UE device 10-1 may transmit emergency message 74.

At operation 132, after predetermined time offset 110 has elapsed since the end of extended preamble 108 was received, UE device 10-2 may reactivate its receiver 48 for emergency message listening window 80 (e.g., beginning at time TC). UE device 10-2 may then receive and decode emergency message 74 during emergency message listening window 80, because UE device 10-2 has now been time-synchronized with UE device 10-1 using extended preamble 108). UE device 10-2 may perform any desired subsequent processing based on emergency message 74.

Using extended preamble 108 to time-synchronize UE device 10-2 to UE device 10-1 may allow UE device 10-2 to implement RX windows 76 having arbitrary RX window lengths L. For example, RX window length L does not need to be at least 2× the size of preamble length T (FIG. 4) to guarantee that a complete sequence is captured. RX window length L may, for example, be equal to the preamble length T of each of the preambles 72 in the series of N preambles 72 of FIG. 6 if desired. This may allow UE device 10-2 to further reduce power consumption relative to examples where a series of N preambles 72 is used for time-synchronization. If desired, the receiver 48 on UE device 10-2 may dynamically adapt or adjust RX window length L over time (e.g., to make detection more or less sensitive and/or to consume more or less power based on the current battery capacity or power consumption on UE device 10-2). If desired, different types of UE device 10-2 may use different RX window lengths L to account for different antenna/receiver performance. UE device 10-2 may detect the end of extended preamble 108 by exploiting the fact that by time TD the sequence has already been detected at UE device 10-2 (e.g., using coherent detection), by exploiting the fact that the end can only appear at fixed positions of the (sub)sequence, etc. Usage of different sequence types (e.g., to convey limited information such as information for identifying one or more frequencies for receipt of emergency message 74 or identifying predetermined time offset 110) is still possible using extended preamble 108 (e.g., by selection of Zadoff Chu sequence root, M-sequence index, etc.).

The example of FIGS. 7 and 8 in which UE device 10-2 keeps its receiver 48 active during extended RX window 76E is merely illustrative. If desired, UE device 10-2 may deactivate its receiver 48 after the RX window 76 in which a portion of extended preamble 108 was received. For example, as shown in FIG. 7, UE device 10-2 may deactivate its receiver 48 at the end of RX window 76. In this example, time-synchronization may be performed based on where in the extended preamble 108 RX window 76 falls. Extended preamble 108 may therefore include a sequence that allows UE device 10-2 to detect where the portion of extended preamble 108 received during RX window 76 is located within extended preamble 108 as a whole.

For example, UE device 10-1 may generate extended preamble 108 as a continuous non-repeating sequence that allows locating position of any subsequence of extended preamble 108 in the continuous non-repeating sequence. The transmitter in UE device 10-1 may produce such a sequence by applying a binary cover code (or a non-binary cover code) on top of an underlying sequence, where the cover code varies across the length of extended preamble 108. The continuous non-repeating sequence may be, for example, a repeated underlying Zadoff Chu sequence that has been provided with a binary cover code that varies across the length of extended preamble 108.

Once UE device 10-2 has received a portion (subsequence) of extended preamble 108 during its RX window 76, UE device 10-2 may process the received portion (subsequence) to identify a time offset between the end of RX window 76 and time TC, when UE device 10-1 will transmit emergency message 74. In the example of FIG. 7, UE device 10-2 may process the subsequence of extended preamble 108 received during RX window 76 to identify time offset 112 (e.g., a time offset that includes the duration that would have been occupied by extended window 76E and predetermined time offset 110) from the end of RX window 76 until the beginning of emergency message listening window 80. The non-repeating structure of extended preamble 108 (e.g., as provided by the cover code) may allow UE device 10-2 to determine or identify the temporal location of the subsequence within extended preamble 108, thereby allowing UE device 10-2 to identify time offset 112 (e.g., given the already predetermined time offset 110 between times TD and TC). UE device 10-2 may then reactivate its receiver after the identified time offset 112 has elapsed since the end of RX window 76 to receive emergency message 74. In other words, UE device 10-2 may synchronize its timing for the receipt of emergency message 74 based on the subsequence of extended preamble 108 received during RX window 76. Synchronizing timing using extended preamble 108 with an overlying cover code in this way may allow UE device 10-2 to minimize power consumption (e.g., because UE device 10-2 can deactivate its receiver after RX window 76) without needing to expend resources detecting the end of extended preamble 108, for example.

Figure 9:
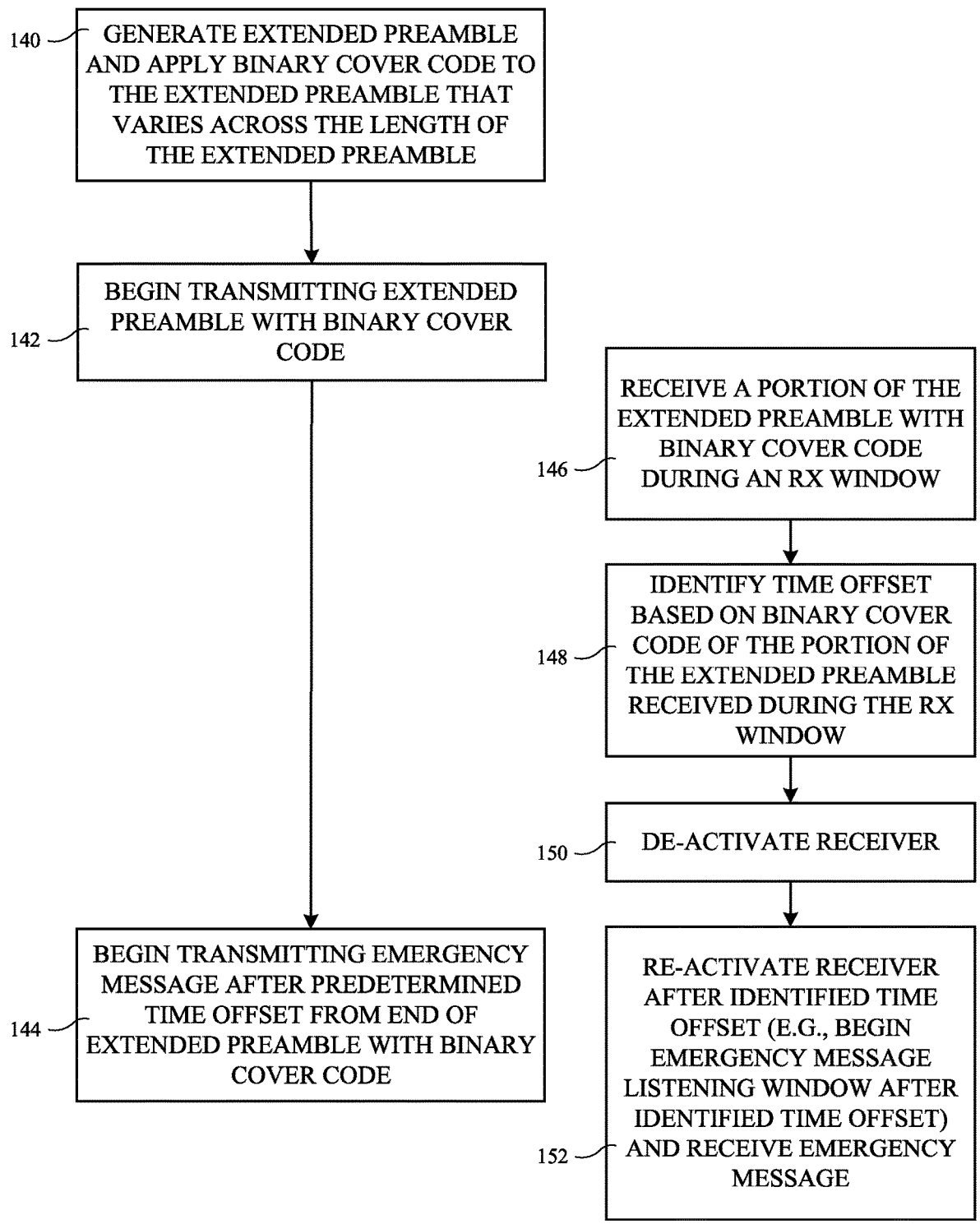
FIG. 9 is a flow chart of illustrative operations involved in using a first user equipment device to transmit device-to-device signals and in using a second user equipment device to synchronize receipt of a message transmitted by the first user equipment device based on an extended preamble with a cover code in the device-to-device signals in accordance with some embodiments.

FIG. 9 is a flow chart of illustrative operations involved in transmitting and receiving an emergency message 74 that is time-synchronized based on an extended preamble 108 of FIG. 7 having an overlying cover code. Operations 140-144 of FIG. 9 may be performed by UE device 10-1 (e.g., while processing operation 56 of FIG. 3). Operations 146-152 of FIG. 9 may be performed by UE device 10-2 (e.g., while processing operations 62 and 64 of FIG. 3).

At operation 140 of FIG. 9, UE device 10-1 may generate extended preamble 108 for transmission. Extended preamble 108 may include a cover code such as a binary cover code over an underlying repeated sequence such as a Zadoff Chu sequence or M-sequence. The cover code may vary across the length of extended preamble 108.

At operation 142, UE device 10-1 may begin transmitting extended preamble 108 to search for a UE device within its coverage area 20 (FIG. 1).

At operation 146, the receiver 48 on UE device 10-2 (e.g., a UE device in coverage area 20) may receive a portion (subsequence) of the extended preamble 108 having an overlying cover code transmitted by UE device 10-1 during one of its RX windows 76.

At operation 148, UE device 10-2 may identify time offset 112 between the end of RX window 76 and emergency message listening window 80 based on the cover code of the subsequence of extended preamble 108 received during the RX window.

At operation 150, UE device 10-2 may deactivate its transmitter (e.g., once RX window 76 has ended) to conserve power. Operations 148 and 150 may be performed concurrently or operation 150 may be performed prior to operation 148 if desired.

At operation 144, after predetermined time offset 110 has elapsed since the end of extended preamble 108 was transmitted, UE device 10-1 may transmit emergency message 74.

At operation 152, after the identified time offset 112 has elapsed since the end of RX window 76, UE device 10-2 may reactivate its receiver 48 for RX window listening window 80 (e.g., beginning at time TC). UE device 10-2 may then receive and decode emergency message 74 during RX window listening window 80 (e.g., because UE device 10-2 has now been time-synchronized with UE device 10-1 using the subsequence of extended preamble 108 received during RX window 76). UE device 10-2 may perform any desired subsequent processing based on emergency message 74.

If desired, UE device 10-2 may transmit D2D signals to UE device 10-1 that include an acknowledgement that UE device 10-2 has received emergency message 74. If UE device 10-1 does not receive an acknowledgement for its emergency message, one reason could be that its timing hypothesis has drifted out of the N*T maximum supported time uncertainty 82 compared to all other potential receivers. In this case, during a subsequent period (e.g., during subsequent iterations of path 58 of FIG. 3), UE device 10-1 may increase the number N of preambles 72 or the length of extended preamble 108 transmitted before subsequent emergency message transmissions. Additionally or alternatively, UE device 10-1 may shift its time to hypothesis forwards in a first RX window period, backwards in the next RX window period, and even further forwards/backwards in subsequent RX window periods to ultimately hit an RX window 76 of the receiver in UE device 10-2. If desired, UE device 10-1 may transmit the series of N preambles 72 and/or extended preamble 108 at a different frequency than emergency message 74 (e.g., the preamble(s) may be transmitted on a common channel whereas frequency hopping is used for transmitting emergency message 74).

The example of FIGS. 1-9 in which UE device 10-1 transmits emergency message 74 at time TC is merely illustrative. In general, UE device 10-1 may transmit any desired data (e.g., message data, application data, control data, video data, voice data, image data, web data, etc.) instead of emergency message 74 (e.g., the synchronization operations described herein may be used to synchronize UE device 10-2 to UE device 10-1 for transfer of any desired wireless data using D2D signals 22). Emergency message 74 may therefore sometimes simply be referred to as message 74. Message 74 may contain emergency payload content (emergency message payload content) as one example. As another example, message 74 may include a header and a control message for CRC purposes (e.g., to exclude false positive preamble detections) and to boot strap subsequent (e.g., bidirectional) communications. Message 74 may include other information if desired. The examples herein described as being related to a binary cover code are merely illustrative and, in general other cover codes such as non-binary cover codes may be used.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-9 (e.g., the operations of FIGS. 3-9) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 30 of FIG. 2). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

If desired, an apparatus may be provided that includes means to perform one or more elements or any combination of elements of one or more methods or processes described herein.

If desired, one or more non-transitory computer-readable media may be provided that include instructions to cause an electronic device, upon execution of the instructions by one or more processors of the electronic device, to perform one or more elements or any combination of elements of one or more methods or processes described herein.

If desired, an apparatus may be provided that includes logic, modules, or circuitry to perform one or more elements or any combination of elements of one or more methods or processes described herein.

If desired, an apparatus may be provided that includes one or more processors and one or more non-transitory computer-readable storage media comprising instructions that, when executed by the one or more processors, cause the one or more processors to perform one or more elements or any combination of elements of one or more methods or processes described herein.

If desired, a signal (e.g., a signal encoded with data), datagram, information element (IE), packet, frame, segment, PDU, or message may be provided that includes or performs one or more elements or any combination of elements of one or more methods or processes described herein.

If desired, an electromagnetic signal may be provided that carries computer-readable instructions, where execution of the computer-readable instructions by one or more processors causes the one or more processors to perform one or more elements or any combination of elements of one or more methods or processes described herein.

If desired, a computer program may be provided that includes instructions, where execution of the program by a processing element causes the processing element to carry out one or more elements or any combination of elements of one or more methods or processes described herein.

The foregoing is merely illustrative and various modifications can be made to the described embodiments. The foregoing embodiments may be implemented individually or in any combination.

What is claimed is:

1. An electronic device comprising:
   one or more antennas;
   a transmitter configured to transmit radio-frequency signals to an additional electronic device using the one or more antennas; and
   one or more processors configured to
      transmit, using the transmitter, a message in the radio-frequency signals, and
      transmit, using the transmitter, a series of preambles in the radio-frequency signals prior to the message, wherein each preamble in the series of preambles identifies, for the additional electronic device, a different respective time offset between an end of that respective preamble and transmission of the message.

2. The electronic device of claim 1, wherein each of the preambles in the series of preambles has a preamble length and the preambles in the series of preambles are separated by gaps during which the transmitter is inactive.

3. The electronic device of claim 2, wherein the one or more processors is further configured to:
   re-transmit the message in the radio-frequency signals; and
   transmit an additional series of preambles in the radio-frequency signals after transmitting the message and prior to re-transmitting the message, wherein the preambles in the additional series of preambles are separated by additional gaps during which the transmitter is inactive, and the additional gaps are separated from the re-transmitted message by the respective time offsets identified by the series of preambles.

4. The electronic device of claim 1, wherein each preamble in the series of preambles is shorter than a receiver window length of the additional electronic device.

5. The electronic device of claim 1, wherein each preamble in the series of preambles comprises an M-sequence or a Zadoff Chu sequence.

6. The electronic device of claim 1, wherein the electronic device is configured to use the one or more antennas to communicate with a wireless base station in an on-grid state and the electronic device is configured to transmit the radio-frequency signals in an off-grid state in which the electronic device is unable to connect to any wireless base stations.

7. The electronic device of claim 1, wherein the transmitter is configured to transmit the series of preambles in the radio-frequency signals at a first frequency and is configured to transmit the message in the radio-frequency signals at a second frequency that is different from the first frequency.

8. The electronic device of claim 1, wherein the electronic device is a first user equipment (UE) device, the additional electronic device is a second UE device, and the radio-frequency signals comprise device-to-device (D2D) signals.

9. An electronic device comprising:
   one or more antennas;
   a transmitter configured to transmit radio-frequency signals to a user equipment device using the one or more antennas; and
   one or more processors configured to
      transmit, using the transmitter, a message in the radio-frequency signals, and
      transmit, using the transmitter, a preamble in the radio-frequency signals prior to the message that identifies, for the user equipment device, a time offset between the preamble and the message wherein the preamble comprises a repeating sequence and the one or more processors is configured to apply a cover code over the repeating sequence that varies across a length of the preamble.

10. The electronic device of claim 9, wherein the radio-frequency signals comprise device-to-device (D2D) signals.

11. The electronic device of claim 9, wherein the cover code comprises a binary cover code.

12. An electronic device comprising:
   one or more antennas;
   a receiver configured to receive radio-frequency signals from an additional electronic device using the one or more antennas; and
   one or more processors configured to
      periodically activate the receiver during a series of receiver (RX) windows,
      receive a preamble sequence in the radio-frequency signals during an RX window of the series of RX windows, deactivate the receiver after the RX window,
re-activate the receiver during a message listening window that begins after a time offset has elapsed since an end of the preamble sequence, the time offset being based on the preamble sequence received during the RX window, and
receive a message in the radio-frequency signals during the message listening window.

13. The electronic device of claim 12, wherein the one or more processors is further configured to identify the time offset based on a cover code applied to the preamble sequence.

14. The electronic device 10, wherein the RX window has a length that is at least twice a length of the preamble sequence.

15. The electronic device of claim 12, wherein the one or more processors is further configured to relay the message to an emergency services provider.

16. The electronic device of claim 12, wherein the one or more processors is further configured to deactivate the receiver between the RX windows in the series of RX windows.

17. The electronic device of claim 12, wherein the receiver is configured to receive the preamble sequence at a first frequency and is configured to receive the message at a second frequency that is different from the first frequency.

18. The electronic device of claim 12, wherein the one or more processors is further configured to receive the message using a frequency hopping pattern identified, by the electronic device, based on the preamble sequence.

19. The electronic device of claim 12, wherein the one or more processors is configured to extend a duration of the RX window in which the preamble sequence is received until the one or more processors detects receipt of an end of the preamble sequence.

20. The electronic device of claim 12, wherein the electronic device is a first user equipment (UE) device, the additional electronic device is a second UE device, and the radio-frequency signals comprise device-to-device (D2D) signals.

* * * * *